United States Patent
Ino et al.

(10) Patent No.: US 7,126,722 B2
(45) Date of Patent: Oct. 24, 2006

(54) IMAGE DATA CONVERSION METHOD AND APPARATUS

(75) Inventors: Hiroki Ino, Kawasaki (JP); Takeshi Nagae, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1047 days.

(21) Appl. No.: 10/094,973

(22) Filed: Mar. 12, 2002

(65) Prior Publication Data
US 2003/0107754 A1    Jun. 12, 2003

(30) Foreign Application Priority Data
Dec. 11, 2001   (JP)   ............... 2001-377319

(51) Int. Cl.
*H04N 1/405*   (2006.01)
(52) U.S. Cl. .................... 358/3.07; 358/3.08
(58) Field of Classification Search ............ 358/1.9, 358/3.07, 3.08, 3.01, 3.06, 1.2
See application file for complete search history.

(56) References Cited

U.S. PATENT DOCUMENTS

| | | | |
|---|---|---|---|
| 4,926,268 A | 5/1990 | Kawamura et al. | |
| 4,942,480 A * | 7/1990 | Shu | 358/3.07 |
| 5,760,918 A | 6/1998 | Tanioka et al. | 358/445 |
| 6,172,769 B1 * | 1/2001 | Rao et al. | 358/1.9 |

FOREIGN PATENT DOCUMENTS

JP           07-212573           11/1995

* cited by examiner

*Primary Examiner*—Scott A. Rogers
(74) *Attorney, Agent, or Firm*—Staas & Halsey LLP

(57) ABSTRACT

This invention is to correct a difference of dot gain between output devices. This invention for converting binary data for a first output device to binary data for a second output device includes the steps of: converting the binary data for the first output device to multi-value data; correcting the multi-value data so that an output density by the second output device becomes equal to an output density by the first output device; and converting the corrected multi-value data to the binary data for the second output device. As stated above, by carrying out the correction so that the output density of the first output device coincides with the output density of the second output device, the user can obtain the same output result without giving consideration to a difference between output devices.

12 Claims, 16 Drawing Sheets

CONVERT TO
MULTI-VALUE

| 0 | 0 | 0 | 0 | 0 |
|---|---|---|---|---|
| 0 | 255 | 255 | 255 | 0 |
| 0 | 0 | 255 | 255 | 0 |
| 0 | 0 | 255 | 0 | 0 |
| 0 | 0 | 0 | 0 | 0 |

400dpi

| 0 | 0 | 0 | 0 | 0 | 0 | 0 |
|---|---|---|---|---|---|---|
| 0 | 100 | 180 | 180 | 180 | 100 | 0 |
| 0 | 130 | 255 | 255 | 255 | 180 | 0 |
| 0 | 100 | 200 | 255 | 255 | 180 | 0 |
| 0 | 0 | 130 | 255 | 200 | 100 | 0 |
| 0 | 0 | 100 | 180 | 100 | 0 | 0 |
| 0 | 0 | 0 | 0 | 0 | 0 | 0 |

560dpi

| DIGITAL VALUE | 0 | 1 | 2 | ... | 10 | ... | 15 | ... | 254 | 255 |
|---|---|---|---|---|---|---|---|---|---|---|
| DENSITY VALUE OF A PLOTTER DEVICE | 0 | 3 | 5 | ... | 25 | ... | 40 | ... | 255 | 255 |
| DENSITY VALUE OF B PLOTTER DEVICE | 0 | 2 | 4 | ... | 20 | ... | 25 | ... | 255 | 255 |
| ⋮ | ⋮ | ⋮ | ⋮ | | ⋮ | | ⋮ | | ⋮ | ⋮ |

FIG. 8

| A PLOTTER DEVICE | 0 | ... | 10 | ... | 255 |
|---|---|---|---|---|---|
| B PLOTTER DEVICE | 0 | ... | 15 | ... | 255 |

| 0 | 0 | 0 | 0 | 0 | 0 | 0 |
|---|---|---|---|---|---|---|
| 0 | 150 | 150 | 150 | 150 | 150 | 0 |
| 0 | 150 | 150 | 150 | 150 | 150 | 0 |
| 0 | 150 | 150 | 180 | 150 | 150 | 0 |
| 0 | 150 | 150 | 150 | 150 | 150 | 0 |
| 0 | 150 | 150 | 150 | 150 | 150 | 0 |
| 0 | 0 | 0 | 0 | 0 | 0 | 0 |

FIG. 13B

| 0 | 0 |  | 0 |  | 0 | 0 |
|---|---|---|---|---|---|---|
| 0 | 255 | 0 | 255 | 0 | 255 | 0 |
| 0 | 0 | 255 | 255 | 0 | 255 | 0 |
| 0 | 255 | 255 | 0 | 255 |  | 0 |
| 0 | 0 | 255 | 0 | 255 | 255 | 0 |
| 0 | 255 | 0 | 255 | 255 | 0 | 0 |
| 0 | 0 | 0 | 0 | 0 | 0 | 0 |

| — | * | 7/16 |
|---|---|---|
| 3/16 | 5/16 | 1/16 |

CONVERSION
FROM BINARY TO
MULTI-VALUE

CONVERSION OF
RESOLUTION IN
MULTI-VALUE
DATA

DENSITY
CONVERSION

| INPUT | OUTPUT |
|---|---|
| 0 | → 0 |
| ⋮ | |
| 100 | → 110 |
| ⋮ | |
| 130 | → 150 |
| ⋮ | |
| 180 | → 190 |
| ⋮ | |
| 200 | → 230 |
| ⋮ | |
| 255 | → 255 |

1781

DENSITY
CORRECTION
TABLE

CONVERSION FROM
MULTI-VALUE TO BINARY

FIG. 15E

RESOLUTION CONVERSION

1 DOT IN 600DPI

1 DOT IN 1200DPI

IMAGE DATA CONVERSION METHOD AND APPARATUS

TECHNICAL FIELD OF THE INVENTION

The present invention relates to an image processing technique, and more particularly to a data processing technique for correcting a difference of bleeding degree between output devices.

BACKGROUND OF THE INVENTION

For example, in the printing business circles, binary data (also called monochrome data) of a printed matter is prepared as printing data, the binary data is outputted by a plotter device, which is a machine for exposing a film, and after development, it is transferred to a printing plate, and printing is performed. Normally, a system in the printing business circles is often constructed to expand data in a resolution peculiar to a plotter. This is because data for a fixed resolution, such as bitmap fonts constructed in units of dots and/or a conversion table for performing conversion to dot data, must be prepared on a system. Thus, in the case where more high resolution output system is installed, in addition to the present conversion table for performing conversion to dot data, bitmap fonts, and an expansion routine for the present resolution, it is necessary to add more conversion table for performing conversion to dot data, bitmap fonts, and an expansion routine for a high resolution, and there is a problem that a system change becomes enormous.

Accordingly, it is conceivable to adopt a method in which binary data of the present resolution is converted to binary data of a high resolution to perform printing. However, when a method is adopted in which the binary data of the present resolution is simply expanded and is complemented by copying, although black and white lines are uniformly arranged in the binary data of the present resolution as shown in FIG. 17A, if the data is converted to that of the high resolution, as shown in FIG. 17B, black and white lines are not uniformly arranged, and interference fringes occurs. Accordingly, the quality can not be obtained to such a degree that the data can be outputted to a film by a plotter.

For example, Japanese Patent No. 2848568 discloses an image processing apparatus in which binary data is converted to multi-value data, and after a desired image processing is carried out, a binary coding processing is carried out to again convert the multi-value data to the binary data. Although this publication states that a high quality image can be obtained at high speed and inexpensively, a problem in printing and the like is not considered.

That is, the problem that a dot gain (bleeding) occurs at the time of printing is not considered. There is a case where the degree of the dot gain becomes different according to types of output devices such as plotters. FIGS. 18A to 18D show examples. FIG. 18A shows digital data of 600 dpi, and FIG. 18B shows digital data of 1200 dpi. It is assumed that the area in the digital data of FIG. 18A is equal to that of FIG. 18B. However, when the data of FIG. 18A is printed, ink is applied in a range surrounded by a thick line as shown in FIG. 18C. On the other hand, when the data of FIG. 18B is printed, ink is applied in a range surrounded by a thick line as shown in FIG. 18D. When FIG. 18C is compared with FIG. 18D, the bleeding of FIG. 18D is low and the output density (area on which ink is applied) is small, whereas the bleeding of FIG. 18C is high and the output density is large. The bleeding of an output device having a low resolution is not necessarily high, and it varies according to the type of the output device. Besides, even if the resolution is the same, there is also a case where a difference occurs in the dot gain according to the output device.

As stated above, even if the area of the digital data is the same, the dot gain varies according to the output device, and as a result, the output density varies. Since the output result varies according to the output device, there is a problem that a user can not easily obtain an intended output result.

SUMMARY OF THE INVENTION

An object of the present is therefore to provide a data processing technique for correcting the difference of dot gain between output devices.

According to a first aspect of the present invention, a data conversion method for converting binary data for a first output device to binary data for a second output device comprises the steps of: converting the binary data for the first output device to multi-value data and storing it in a storage device; correcting the multi-value data so that an output density by the second output device becomes equal to an output density by the first output device and storing it in the storage device; and converting the corrected multi-value data to the binary data for the second output device and storing it in the storage device.

As stated above, by carrying out the correction so that the output density of the first output device coincides with the output density of the second output device, the user can obtain the same output result without giving consideration to the difference between the output devices.

Besides, the aforementioned step of converting the binary data may include the steps of: converting the binary data for the first output device to multi-value data having a resolution of the first output device; and converting the multi-value data having the resolution of the first output device to multi-value data having a resolution of the second output device. By this, even in the case where data is outputted to an output device having a different resolution, it becomes possible to deal with the data.

Besides, in the aforementioned correcting step, the multi-value data generated in the step of converting the binary data may be corrected by using a corresponding relation between a digital value of the multi-value data for the first output device and a digital value of the multi-value data for the second output device, that cause the output density by the second output device to become equal to the output density by the first output device. For example, a lookup table based on the corresponding relation is created, and input multi-value data is replaced in accordance with values of the lookup table. Incidentally, the lookup table of the corresponding relation may be created in advance, or may be created after the first output device and the second output device are specified and before the above correcting step is carried out.

In a data conversion method according to a second aspect of the present invention, when binary data for a first output device is outputted by a second output device having a different resolution, the binary data for the first output device is converted to binary data for the second output device so that an output density by the second output device becomes equal to an output density of the first output device, and it is stored in a storage device.

Incidentally, the aforementioned method can be performed by a program and a computer, and this program is stored in a storage medium or a storage device, for example, a flexible disk, a CD-ROM, a magneto-optical disk, a semiconductor memory, or a hard disk. Besides, there is also a case where the program is distributed through a network or the like. Incidentally, an intermediate processing result is temporarily stored in a memory.

BRIEF DESCRIPTION OF THE DRAWINGS

FIG. 8 shows an example of a table expressing a relation between digital values and density values of respective output devices;

FIG. 11 shows an example of a density correction table;

FIGS. 13A and 13B are diagrams showing a specific example of a multi-value binary conversion processing;

FIG. 14 shows an example of a matrix used in an error diffusion method;

FIGS. 15A, 15B, 15C, 15D and 15E are diagrams expressing specific data changing in accordance with the processing flow of the binary resolution converting library;

DETAILED DESCRIPTION OF THE PREFERRED EMBODIMENTS

Figure 1:
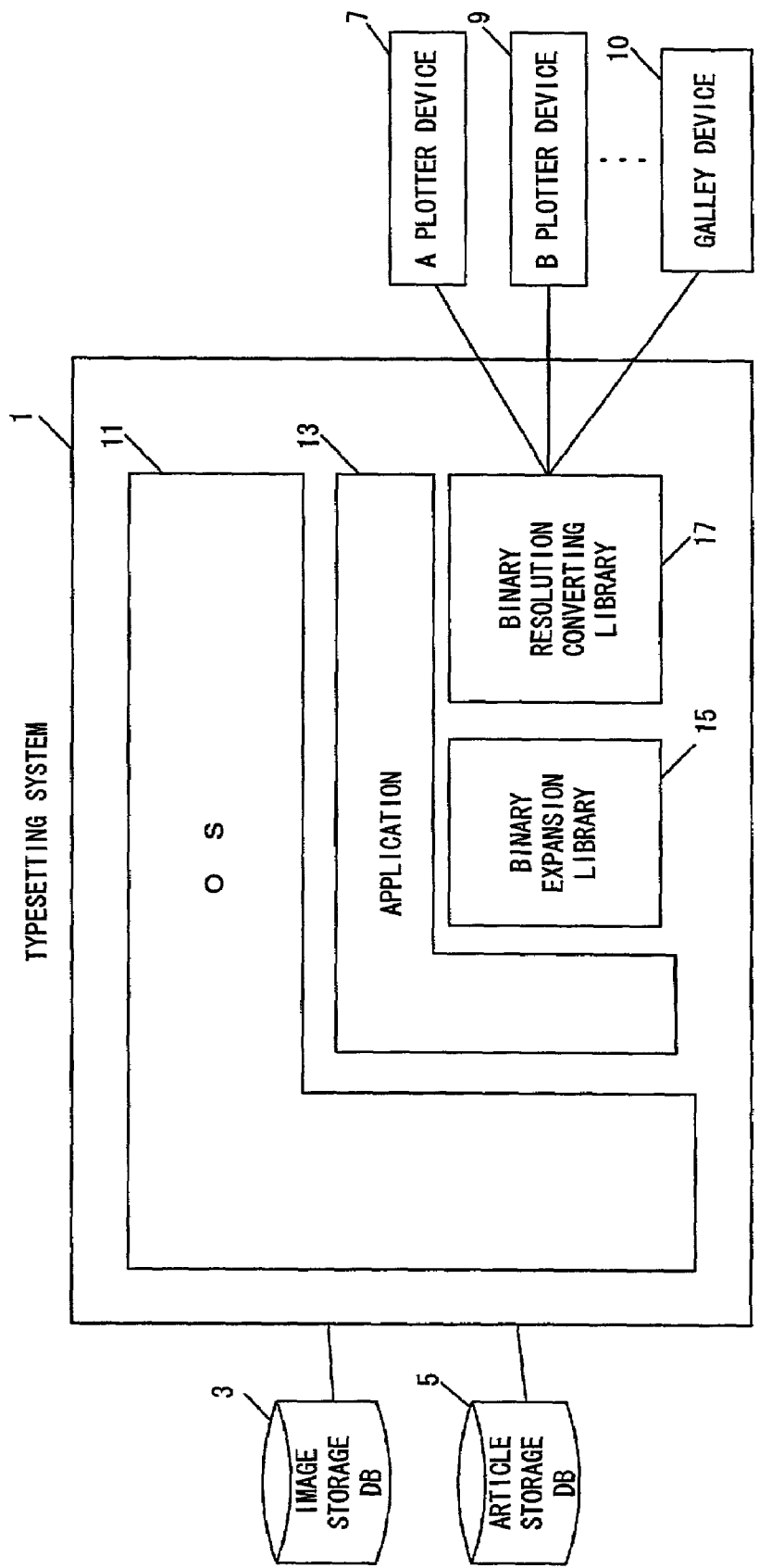
FIG. 1 is a diagram for explaining the outline of a system according to an embodiment of the present invention.

FIG. 1 is a diagram showing the outline of a system according to an embodiment of the present invention. A typesetting system 1 is a system for laying out, for example, an image and an article used for page space of a newspaper, generating binary image data relating to the page space, and outputting to an A plotter device 7, a B plotter device 9, a galley device 10, and the like. The image data used in the typesetting system 1 is stored in an image storage DB3. The article data used in the typesetting system 1 is stored in an article storage DB 5. The typesetting system 1 includes an OS (Operating System) 11, an application 13 for carrying out a processing of laying out the image and the article used for the page space of the newspaper, etc., a binary expansion library 15 for expanding the image (multi-value data) and character data (outline font, etc.) into binary data for, for example, the A plotter device 7, and a binary resolution converting library 17 for carrying out a main processing in this embodiment. The processing of the binary resolution converting library 17 will be described later in detail. Incidentally, the A plotter device 7 and the B plotter device 9 are devices for printing the binary data as to the page space onto a film. The galley device 10 is a device for printing the binary data as to the page space. Incidentally, test printing used for correction of the press is carried out by this galley device 10.

Figure 2:
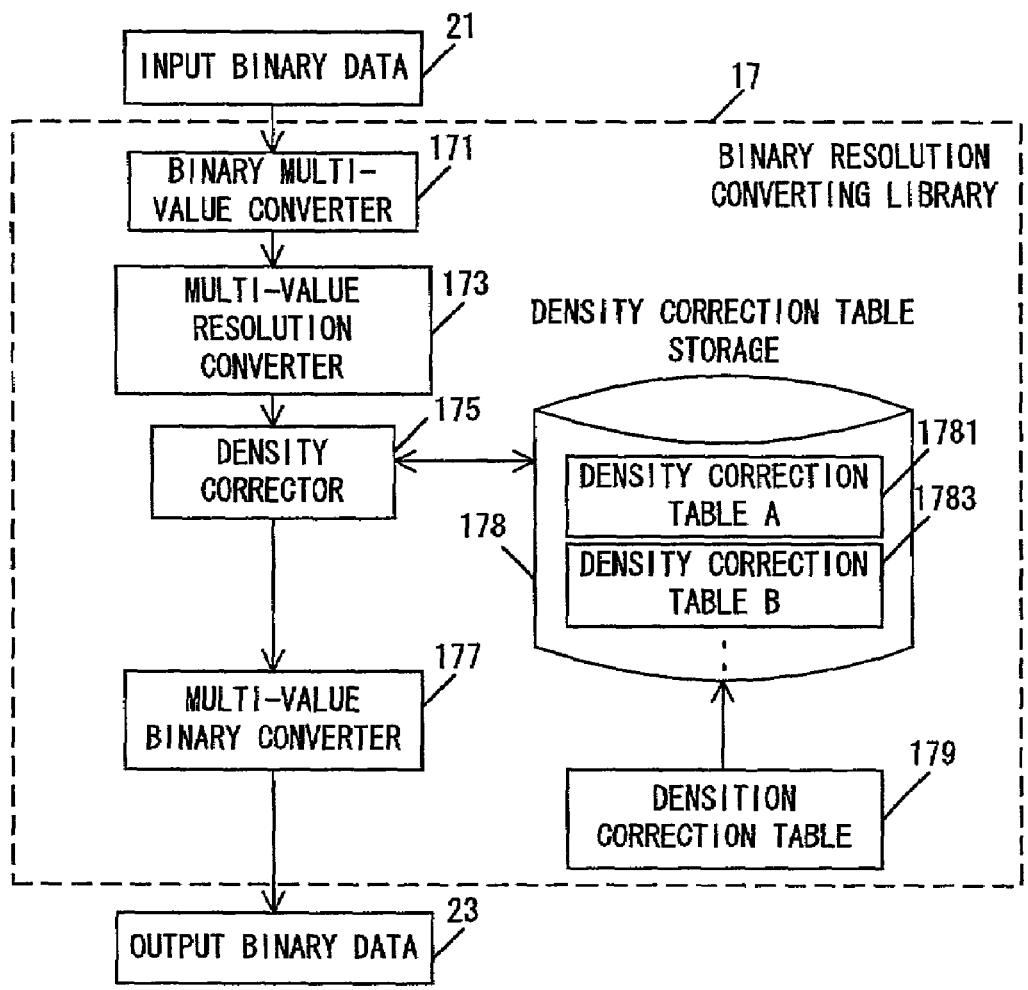
FIG. 2 is a functional block diagram of a binary resolution converting library.

FIG. 2 is a functional block diagram of the binary resolution converting library 17. The binary resolution converting library 17 includes a binary multi-value converter 171 for converting input binary data 21 generated in the binary expansion library 15 for the A plotter device 7 to multi-value data, a multi-value resolution converter 173 for converting the resolution of the multi-value data generated by the binary multi-value converter 171, a density correction table storage 178 for storing a density correction table a(1781), a density correction table b(1783) and the like, a density corrector 175 for carrying out density correction for the multi-value data by referring to the density correction table storage 178 to make output densities identical to each other, and a multi-value binary converter 177 for converting the corrected multi-value data to binary data for, for example, the B plotter device 9 to generate output binary data 23. Incidentally, there is also a case where a density correction table generator 179 for generating a density correction table is provided.

Next, the processing of the binary resolution converting library 17 will be described with reference to FIGS. 3 to 16. The binary multi-value converter 171 uses the input binary data 21 to carry out a processing for converting binary data to multi-value data, and stores a processing result in a storage device (step S1). In the case of 256 gradations, for example, a digital value of 0 in the input binary data 21 is converted to 0, and a digital value of 1 in the input binary data 21 is converted to 255. This processing is illustrated as in FIGS. 4A and 4B. A painted portion in FIG. 4A has a digital value of 1, and a white portion has a digital value of 0. In FIG. 4B, a digital value of 255 is allocated to the painted portion in FIG. 4A, and a digital value of 0 is allocated to the white portion in FIG. 4A.

Figures 5A, 5B:
FIGS. 5A and 5B are diagrams showing a specific example of a multi-value resolution conversion processing.
Figure 6:
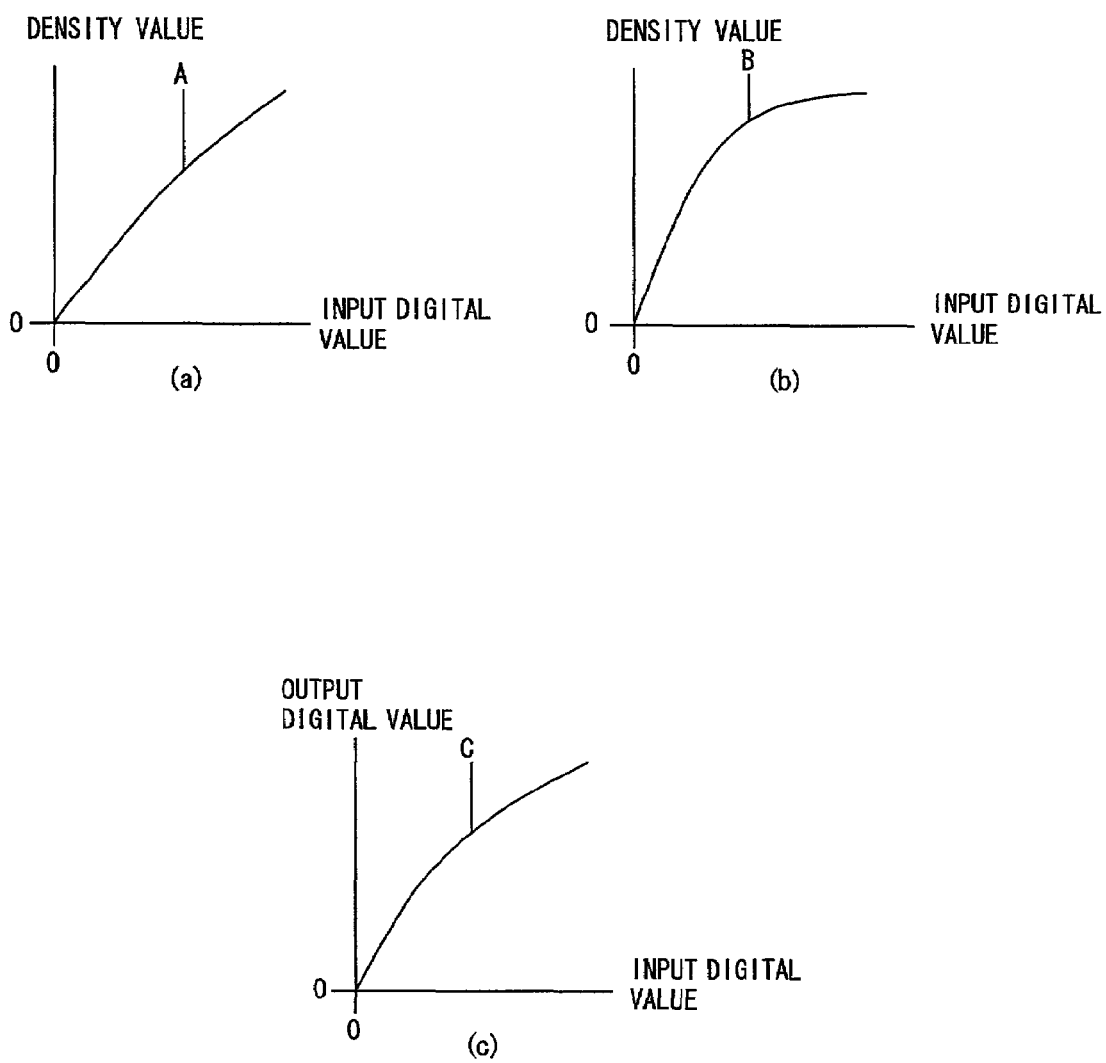
FIGS. 6A, 6B and 6C are graphs for explaining the concept of a density correction processing.

Next, the multi-value resolution converter 173 carries out a multi-value resolution conversion processing for converting the resolution (for example, the resolution of the A plotter device 7) of the generated multi-value data to the resolution (for example, the B plotter device 9) of an output device used at this time, and stores a processing result in the storage device (step S3). In the multi-value resolution conversion processing, a technique, such as bilinear or bicubic technique, well known in the field of image processing is used. However, the invention is not limited to these, but may adopt another enlarging and/or reducing method. For example, FIGS. 5A and 5B show an example of a case where the resolution of the A plotter device 7 is 400 dpi, and the resolution of the B plotter device is 560 dpi. A digital value of 255 is allocated to a painted portion in FIG. 5A, and when this is enlarged by the bilinear system or the like, it becomes as shown in FIG. 5B. In FIG. 5B, digital values other than 0 are allocated to the painted portion. In FIG. 5A, a value other than 255 is not allocated to the painted portion, however, in FIG. 5B, halftone digital values other than 255 are also generated.

Then, the density corrector 175 carries out the density correction processing using the density correction table, and stores a processing result in the storage device (step S5). Here, the density correction table will be described. Binary data corresponding to a predetermined input digital value (multi-value data) is generated, and the result of the output of the binary data by the A plotter device 7 is measured by a measuring device. By repeating this, as shown in FIG. 6A, an output characteristic curve A of the output density value (measurement value of printed matter) with respect to the input digital value (multi-value data) can be obtained. Similarly, binary data corresponding to a predetermined input digital value (multi-value data) is generated, and the result of the output of the binary data by the B plotter device 9 is measured by the measuring device. By repeating this, as shown in FIG. 6B, an output characteristic curve B of the output density value (measurement value of printed matter) with respect to the input digital value (multi-value data) can be obtained. A difference between the output characteristic curves A and B is a difference of dot gain between the A plotter device 7 and the B plotter device 9. When the input digital value is corrected by the amount of this difference of the dot gain, it becomes possible to make the output densities identical to each other. That is, as shown in FIG. 6C, a curve C is used which converts the input digital value for the A plotter device 7 (output of the multi-value resolution converter 173) to the output digital value for the B plotter device 9. The density correction table is formed by converting the curve shown in FIG. 6C into a lookup table.

Figure 7:
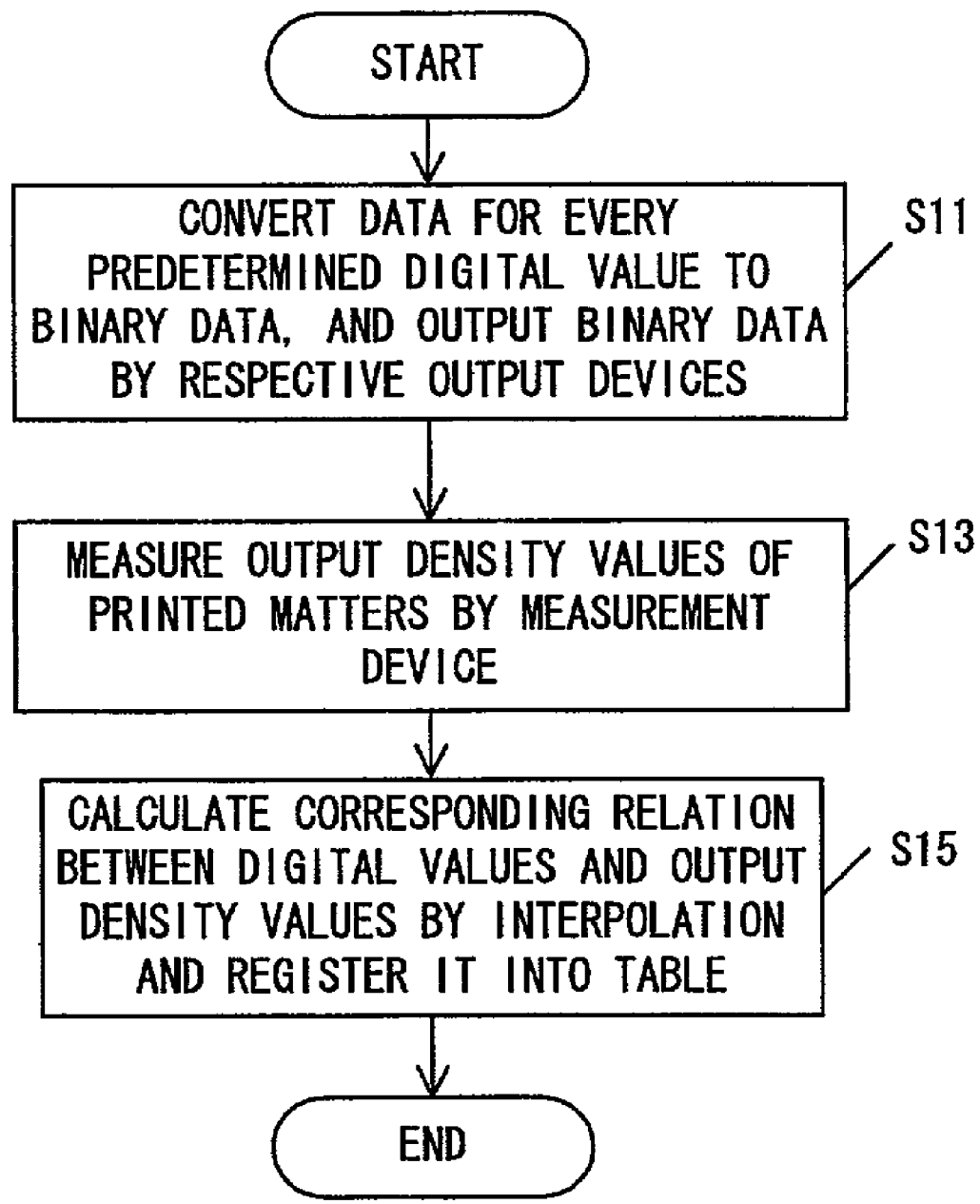
FIG. 7 is a flowchart showing a flow of a pre-processing of a processing for generating a density correction table.

A method of generating the density correction table will be described with reference to FIGS. 7 to 11. A processing flow shown in FIG. 7 is a processing which needs to be previously carried out. First, data for every predetermined digital value (multi-value data) is converted to binary data by a predetermined method, and the binary data is outputted by the respective output devices (step S11). The output density values of printed matters or the like by the respective output devices are measured by the measuring device (step S13). Since output density values corresponding to all digital values can not be measured, the corresponding relation between the respective digital values and the output density values is calculated by interpolation, and is registered in a table for respective output devices (step S15). For example, a table as shown in FIG. 8 is generated. That is, digital values of 0 to 255, density values of the A plotter device 7 corresponding to the respective digital values, density values of the B plotter device 9 corresponding to the respective digital values, and the like are registered.

Figure 9:
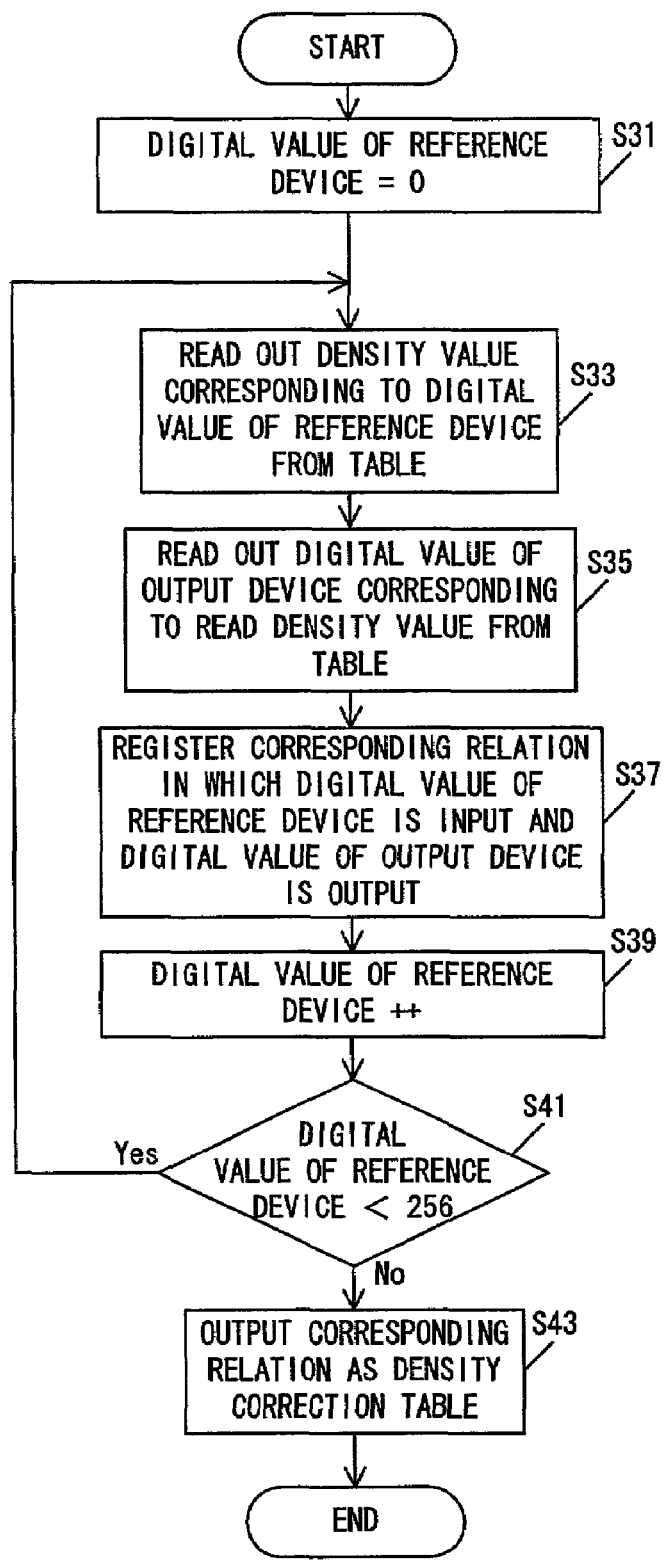
FIG. 9 is a flowchart showing a processing for generating a density correction table.
Figure 10:
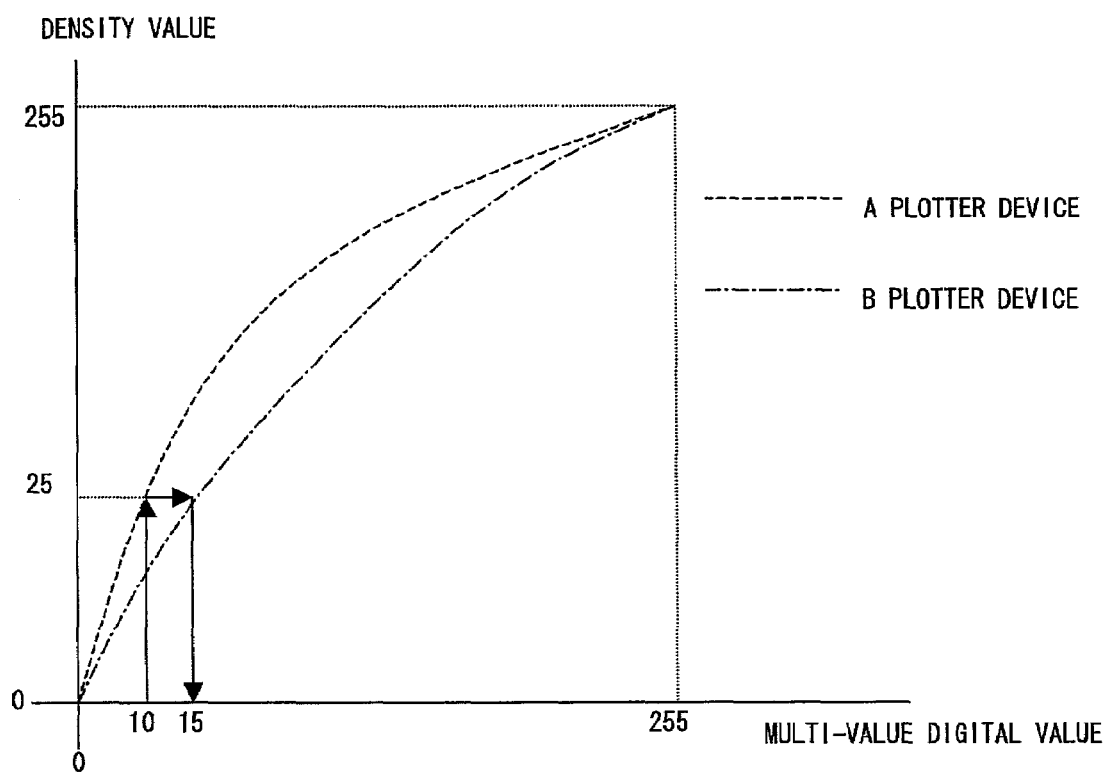
FIG. 10 is a diagram for explaining the processing for generating the density correction table.
Figure 12:
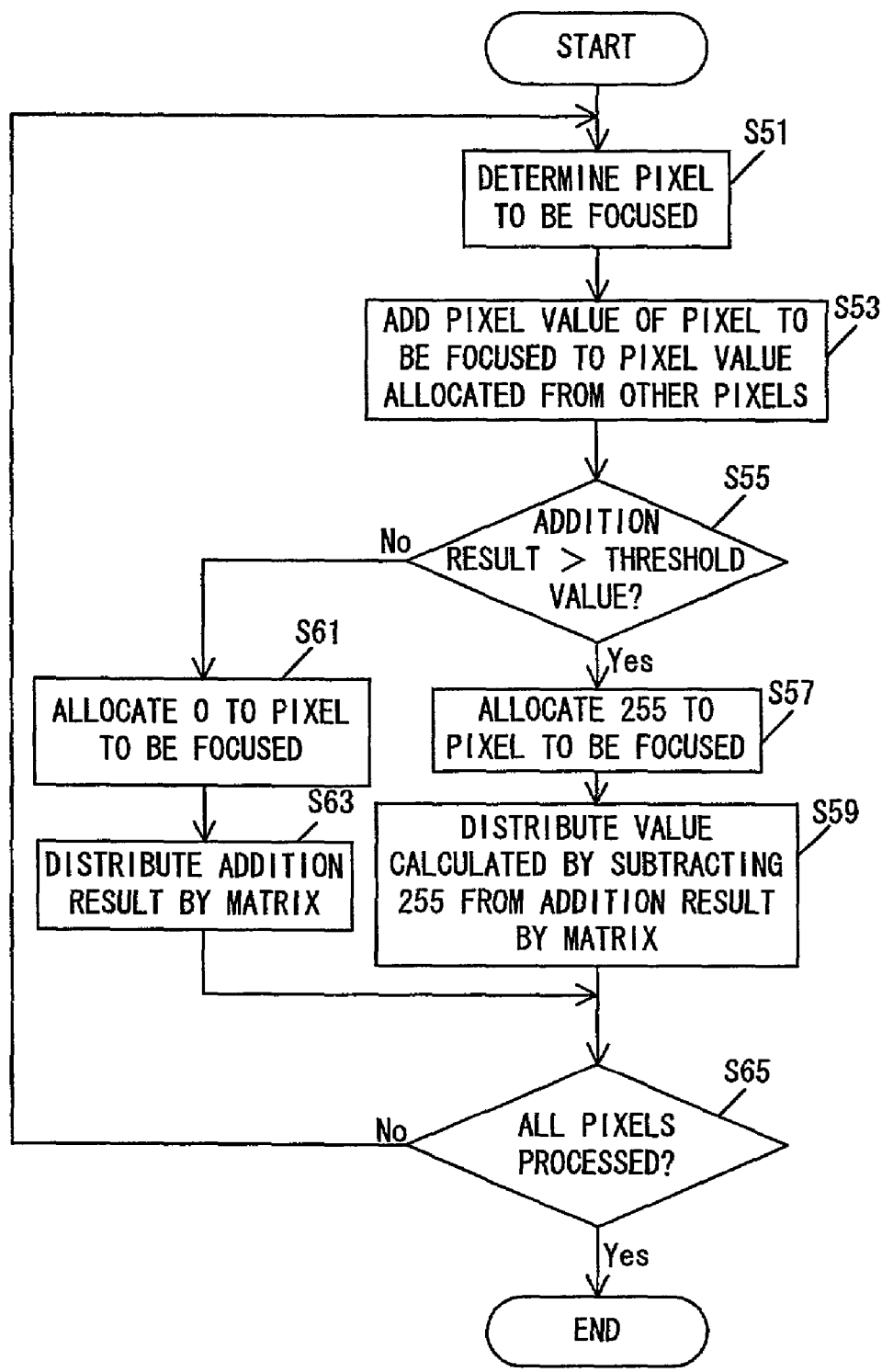
FIG. 12 is a flowchart showing a processing flow of an error diffusion method as one method of a multi-value binary conversion processing.
Figure 16:
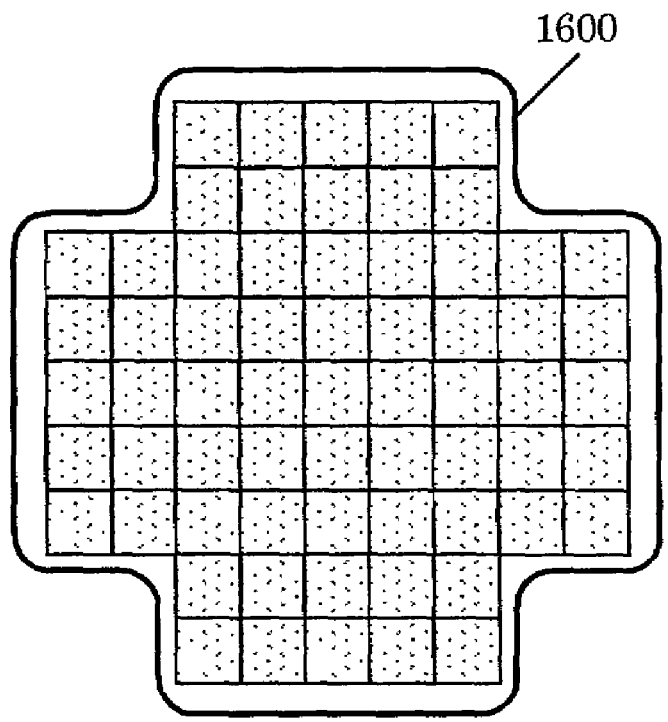
FIG. 16 shows a flow of data, which is generated in accordance with the processing flow of the present embodiment.
Figure 17A:
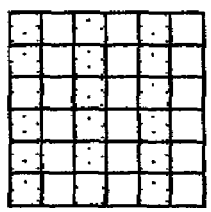
FIGS. 17A and 17B are diagrams showing a specific example of a conventional resolution conversion processing.
Figure 17B:
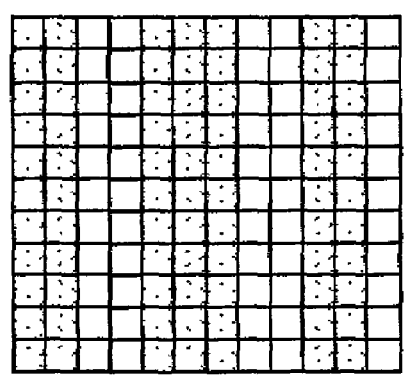

Next, a processing for generating a density correction table to be carried out before step S5 in FIG. 3 will be described with reference to FIGS. 9 to 11. This processing is carried out by, for example, the density correction table generator 179. First, a digital value for a reference device (for example, the A plotter device 7) is set to 0 (step S31). Then, a density value corresponding to the digital value of the reference device is read out from a table as shown in FIG. 8 (step S33). Besides, a digital value of an output device corresponding to the read density value is read out from the table (step S35). The content of this processing will be described with reference to FIG. 10. In the graph of FIG. 10, the horizontal axis indicates a digital value of multi-value data, and the vertical axis indicates a density value. A dotted line is an output characteristic curve of the A plotter device 7, and an alternate long and short dash line is an output characteristic curve of the B plotter device 9. For example, a density value corresponding to a digital value of 10 for the A plotter device 7 as the reference device is 25, which is a value of a point on the dotted line curve. On the other hand, a digital value of a point on the alternate long and short dash line, having a density value of 25, is 15. That is, in order to output the density value of 25, the A plotter device 7 requires the digital value of 10, and the B plotter device 9 requires the digital value of 15. In the case of data for the A plotter device 7, if the value of 10 is not corrected to 15, the same output density can not be obtained by the B plotter device 9. Such corresponding relation is obtained at steps S31 to S35.

The corresponding relation obtained in this way in which the digital value of the reference device is set to an input and the digital value of the output device is set to an output, is stored in the storage device (step S37). Then, the digital value of the reference device is incremented by one (step S39). The processing of steps S33 to S39 is repeated until the digital value of the reference device becomes 256 (step S41). If the digital value of the reference device becomes 256, the obtained corresponding relation is outputted, as the density correction table for the reference device and this output device, to the density correction table storage 178, and is stored in the density correction table storage 178 (step S43).

FIG. 11 shows an example of the density correction table. In FIG. 11, corresponding digital values for the B plotter device 9 are registered for respective digital values of 0 to 255 for the A plotter device 7. This density correction table is generated for each combination of reference devices and output devices.

Accordingly, at step S5 (FIG. 3), the respective digital values contained in the multi-value data outputted by the multi-value resolution converter 173 are corrected by referring to the lookup table as shown in FIG. 11. That is, the lookup table is searched by using the respective digital values contained in the multi-value data outputted by the multi-value resolution converter 173, and the corresponding digital values are obtained.

Figure 3:
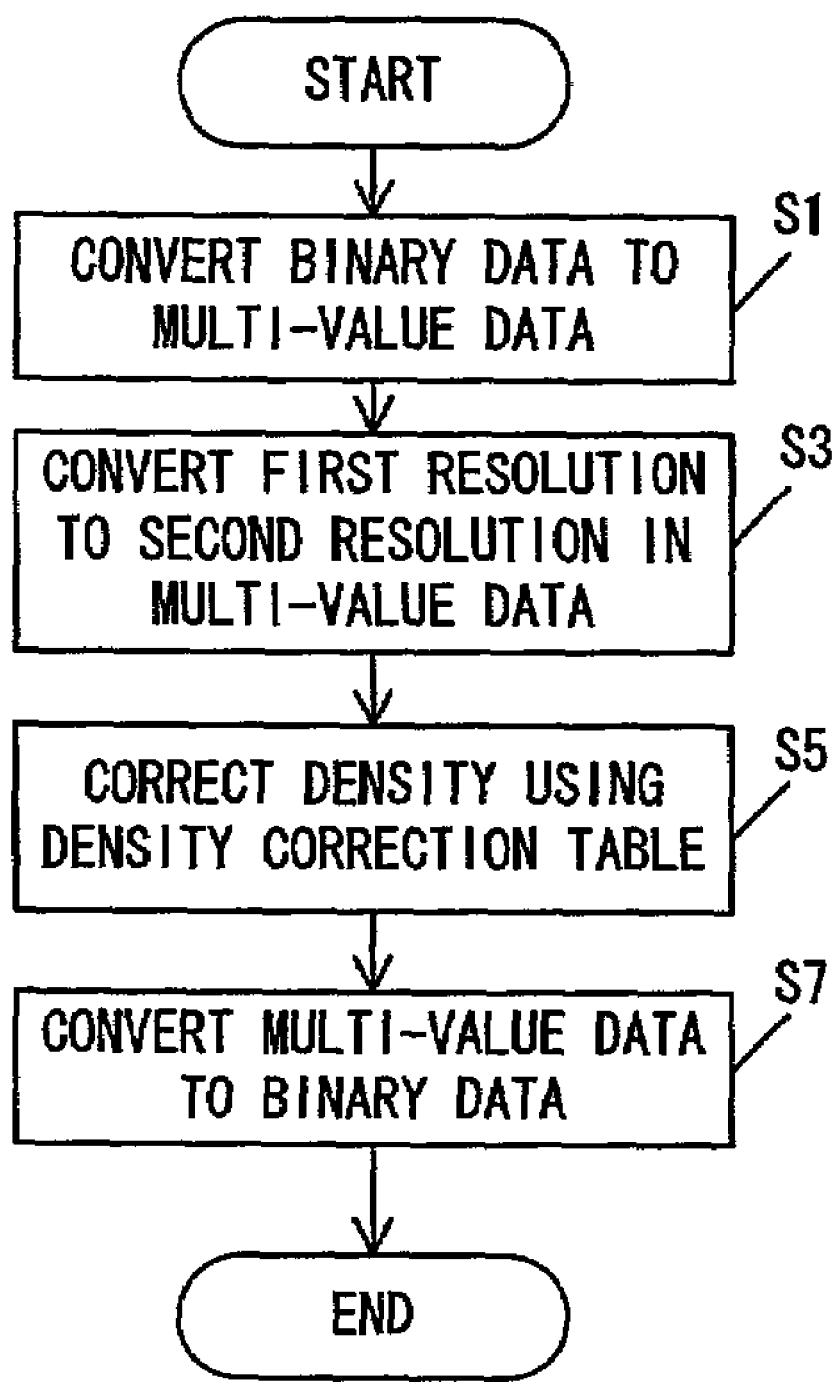
FIG. 3 is a flowchart showing a processing flow of the binary resolution converting library.
Figures 4A, 4B:
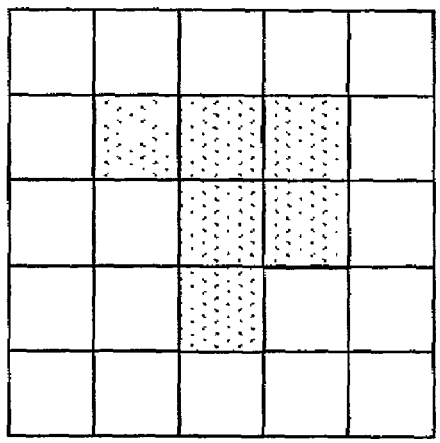
FIGS. 4A and 4B are diagrams showing a specific example of a binary multi-value conversion processing.

Returning to the description of FIG. 3, next, the multi-value binary converter 177 carries out a processing for converting multi-value data to binary data, and stores a processing result in the storage device (step S7). Incidentally, it may be outputted to the B plotter device 9 as the present output device. As an example of the processing for converting multi-value data to binary data, there is an error diffusion method. The outline of the processing of the error diffusion method will be described with reference to FIGS. 12 to 16.

First, a pixel to be focused is determined (step S51). For example, a pixel surrounded by a thick line in FIG. 13A is set as the pixel to be focused. Then, a pixel value of the pixel to be focused and pixel values allocated from other pixels are added (step S53). In the case of FIG. 13A, it is assumed that the pixel value allocated from other pixels does not exist. Then, a predetermined threshold value is compared with the addition result at the step S53, and it is judged whether the addition result is larger than the threshold value (step S55). If the addition result is larger than the threshold value, a pixel value of 255 is allocated to the pixel to be focused (step S57). In the example of FIG. 13A, when the pixel value of the pixel to be focused is 150 and the threshold value is 128, since the pixel value of the pixel to be focused is larger, 255 is allocated to the pixel to be focused. By this, it becomes a pixel surrounded by a thick line in FIG. 13B. In the case where a value of 255 is allocated, it is regards as 1 in the binary data. Then, a value calculated by subtracting 255 from the addition result at the step S53 is distributed to other surrounding pixels in accordance with a predetermined matrix (step S59). In the case of FIG. 13A, $-105$ ($=150-255$) is distributed in accordance with the matrix as shown in FIG. 14. Incidentally, * in FIG. 14 denotes the pixel to be focused, and any value is not distributed to the left adjacent pixel. This matrix is an example.

On the other hand, in the case where the addition result at the step S53 is not larger than the threshold value, a pixel value of 0 is allocated to the pixel to be focused (step S61). Then, the addition result is distributed to other surrounding pixels in accordance with, for example, the matrix shown in FIG. 14 (step S63).

Then, after the step S59 or S63, it is judged whether all pixels are processed (step S65). In case an unprocessed pixel exists, the procedure is returned to the step S51. On the other hand, in case all the pixels are processed, the processing is ended. By carrying out such processing, an intermediate value between 0 and 255 existing in FIG. 13A is converted to either one of 0 and 255 as shown in FIG. 13B. The number of pixels having values of 255 becomes large as the number of pixels having values near the digital value of 255 becomes large in the multi-value data.

The flow of the processing results of the respective steps of the processing explained with reference to FIG. 3 are summarized in FIGS. 15A to 15E. FIG. 15A shows an example of the binary data for the A plotter device 7. The binary data of FIG. 15A is converted to the multi-value data as shown in FIG. 15B by the binary multi-value converter 171. In this example, since a simple binary multi-value conversion is carried out, 0 of the binary data corresponds to 0 of the multi-value data, and 1 of the binary data corresponds to 255 of the multi-value data. Then, the multi-value resolution converter 173 carries out the processing of converting the resolution of the multi-value data of FIG. 15A to the resolution of the B plotter device 9 by, for example, a bilinear or bicubic system, and generates, for example, the data of FIG. 15C. Here, not only 0 and 255, but also digital values between 0 and 255 are also generated. Next, the density corrector 175 refers to the density correction table 1781, carries out the density correction processing to the data of FIG. 15C, and generates the data of FIG. 15D. By this, the multi-value data for the B plotter device 9 is generated. Then, the multi-value binary converter 177 carries out the processing for converting the multi-value data to the binary data for the multi-value data of FIG. 15D by, for example, the error diffusion method or the like, and generates the data of FIG. 15E. By this, the binary data, which can be outputted to the B plotter device 9, is generated. When this binary data is outputted by the B plotter device 9, it is outputted with the output density similar to the case where the A plotter device 7 makes an output.

Figure 18A:
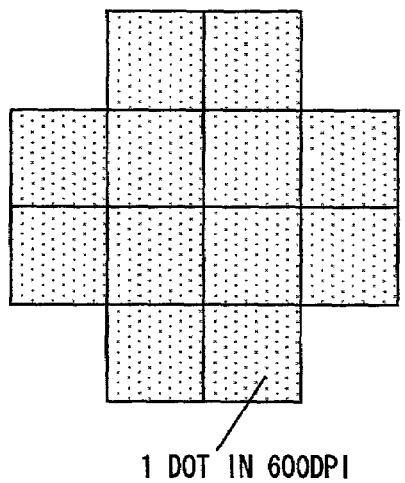
FIGS. 18A, 18B, 18C and 18D are diagrams for explaining a problem of a conventional technique.
Figure 18B:
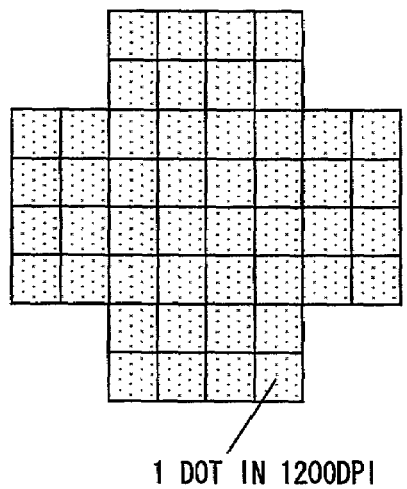
Figure 18C:
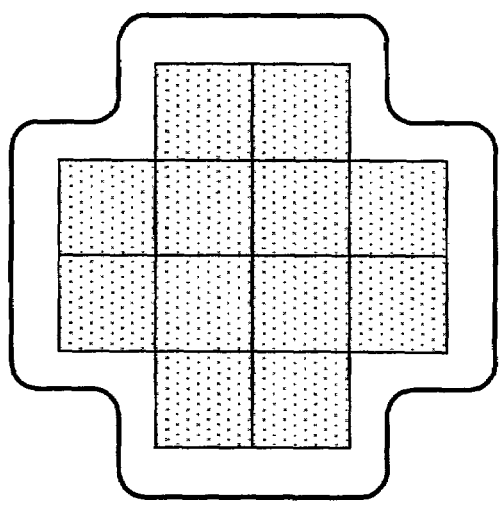
Figure 18D:
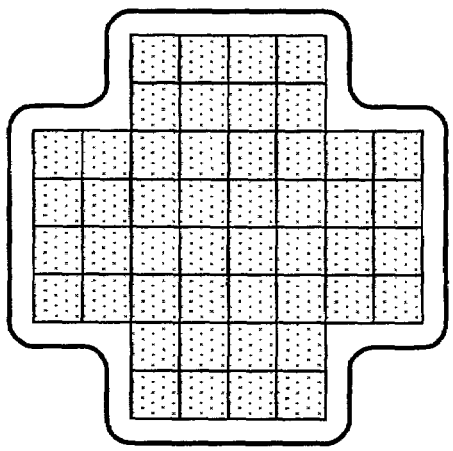

That is, the difference of the output density due to the difference of the dot gain as shown in FIGS. 18C and 18D is mainly corrected by the density corrector 175. That is, since digital data 1600 (FIG. 16) different from FIG. 18D is generated by the density corrector 175 and the multi-value binary converter 177, the output density indicated by a thick line becomes identical to that of FIG. 18C. By this, even if the output device is different, the user can output the data without giving attention to the difference.

In the above, although the embodiment of the present invention has been described, the present invention is not limited to this. For example, although the description has been mainly given of the example of the plotter device, the output device may be another kind of output device. Besides, although the description has been given of the case where the binary resolution converting library 17 is built into the typesetting system, this is also an example, and there is also a case where it is built into another image processing apparatus. Besides, the configuration of functional blocks as shown in FIG. 2 is an example, and there is also a case where it does not coincide with the configuration of modules in an actual program. Besides, in the density corrector 175, although the example of using the lookup table as shown in FIG. 11 has been described, the present invention is not limited to this, but such a configuration may be adopted that a function as expressed in FIG. 11 is prepared, and the correction is carried out by this function.

Besides, even if the resolution of the A plotter device 7 is equal to that of the B plotter device 9, there is a case where the output characteristics are different from each other. Even in such a case, there is also case where the present invention can be applied. In FIG. 7, the data for every predetermined digital value (multi-value data) is converted to the binary data by the predetermined method, and is outputted by the respective output device. However, for example, data of every predetermined dot % is outputted by respective output devices, and digital value (multi-value data) corresponding to the dot % may be separately obtained.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. A data conversion method for converting binary image data for a first output device to binary image data for a second output device, comprising:
    converting binary image data for a first output device to multi-value image data;
    correcting said multi-value image data so that an output density by a second output device becomes equal to an output density by said first output device, by using a corresponding relation between a digital value of said multi-value image data for said first output device and a digital value of said multi-value image data for said second output device, that cause said output density by said second output device to become equal to said output density by said first output device; and
    converting the corrected multi-value image data to binary image data for said second output device.

2. The data conversion method as set forth in claim 1, wherein said converting binary image data comprises:
    converting binary image data for a first output device to multi-value image data having a resolution of said first output device; and
    converting said multi-value image data having said resolution of said first output device to multi-value image data having a resolution of a second output device.

3. The data conversion method as set forth in claim 1, further comprising generating a table concerning said corresponding relation.

4. The data conversion method as set forth in claim 1, wherein said correcting comprises correcting said multi-value image data by referring to a table concerning said corresponding relation.

5. A data conversion program embodied on a computer-readable medium for causing a computer to convert binary image data for a first output device to binary image data for a second output device, said data conversion program comprising:
    converting binary image data for a first output device to multi-value image data;
    correcting said multi-value image data so that an output density by a second output device becomes equal to an output density by said first output device by using a corresponding relation between a digital value of said multi-value image data for said first output device and a digital value of said multi-value image data for said second output device, that cause said output density by said second output device to become equal to said output density by said first output device; and converting the corrected multi-value image data to binary image data for said second output device.

6. The data conversion program embodied on a computer-readable medium as set forth in claim 5, wherein said converting binary image data comprises:

converting binary image data for a first output device to multi-value image data having a resolution of said first output device; and converting said multi-value image data having said resolution of said first output device to multi-value image data having a resolution of a second output device.

7. The data conversion program embodied on a computer-readable medium as set forth in claim 5, further comprising generating a table concerning said corresponding relation.

8. The data conversion program embodied on a computer-readable medium as set forth in claim 5, wherein said correcting comprises correcting said multi-value image data by referring to a table concerning said corresponding relation.

9. A data conversion apparatus for converting binary image data for a first output device to binary image data for a second output device, comprising:

means for converting binary image data for a first output device to multi-value image data;

means for correcting said multi-value image data so that an output density by a second output device becomes equal to an output density by said first output device by using a corresponding relation between a digital value of said multi-value image data for said first output device and a digital value of said multi-value image data for said second output device, that cause said output density by said second output device to become equal to said output density by said first output device; and means for converting the corrected multi-value image data to binary image data for said second output device.

10. The data conversion apparatus as set forth in claim 9, wherein said means for converting binary image data comprises:

means for converting binary image data for a first output device to multi-value image data having a resolution of said first output device; and means for converting said multi-value image data having said resolution of said first output device to multi-value image data having a resolution of a second output device.

11. The data conversion apparatus as set forth in claim 9, further comprising means for generating a table concerning said corresponding relation.

12. The data conversion apparatus as set forth in claim 9, wherein said means for correcting comprises means for correcting said multi-value image data by referring to a table concerning said corresponding relation.

* * * * *